US010248639B2

(12) United States Patent
Dayama et al.

(10) Patent No.: US 10,248,639 B2
(45) Date of Patent: Apr. 2, 2019

(54) RECOMMENDING FORM FIELD AUGMENTATION BASED UPON UNSTRUCTURED DATA (71) Applicant: International Business Machines Corporation, Armonk, NY (US)

(72) Inventors: Pankaj S. Dayama, Bangalore (IN); Varun R. Embar, Bangalore (IN); Vinayaka Pandit, Bangalore (IN)

(73) Assignee: INTERNATIONAL BUSINESS MAHCINES CORPORATION, Armonk, NY (US)

( * ) Notice: Subject to any disclaimer, the term of this patent is extended or adjusted under 35 U.S.C. 154(b) by 439 days.

(21) Appl. No.: 15/013,845

(22) Filed: Feb. 2, 2016

(65) Prior Publication Data
US 2017/0220541 A1 Aug. 3, 2017

(51) Int. Cl.
*G06F 17/24* (2006.01)
*G06F 17/30* (2006.01)

(52) U.S. Cl.
CPC ............ *G06F 17/243* (2013.01); *G06F 17/24* (2013.01); *G06F 17/248* (2013.01); *G06F 17/30675* (2013.01); *G06F 17/30713* (2013.01)

(58) Field of Classification Search
CPC .... G06F 17/24; G06F 17/243; G06F 17/2725; G06F 17/248; G06F 17/30675; G06F 17/30713
See application file for complete search history.

(56) References Cited

U.S. PATENT DOCUMENTS

| 7,752,159 | B2 | 7/2010 | Nelken et al. |
| 8,577,884 | B2 | 11/2013 | Poteet et al. |
| 9,038,177 | B1 | 5/2015 | Tierney |
| 9,110,882 | B2 | 8/2015 | Overell et al. |
| 2002/0019833 | A1* | 2/2002 | Hanamoto ........ G06F 17/30265 715/204 |
| 2005/0289182 | A1* | 12/2005 | Pandian ............. G06K 9/00442 |
| 2009/0327230 | A1 | 12/2009 | Levin et al. |
| 2014/0003717 | A1* | 1/2014 | Brito .................. G06K 9/00449 382/170 |

(Continued)

FOREIGN PATENT DOCUMENTS

CN 102968696 A 3/2013

*Primary Examiner* — Thu V Huynh
(74) *Attorney, Agent, or Firm* — Ference & Associates LLC (57) ABSTRACT One embodiment provides a method for recommending a structured field for a form from unstructured text data, the method including: utilizing at least one processor to execute computer code that performs the steps of: obtaining text data from at least one unstructured field, wherein the at least one unstructured field is contained within a completed form generated from a template form; identifying at least one topic associated with the text data; generating a model, wherein the model analyzes use of the least one topic as a structured field; determining, using the model, whether the accuracy of the template form has increased based upon use of the at least one topic as a structured field; and recommending, based upon the determining, at least one modification for a structured field for the template form, wherein the at least one structured field is associated with the at least one topic.

20 Claims, 2 Drawing Sheets

(56) References Cited

U.S. PATENT DOCUMENTS

| | | | |
|---|---|---|---|
| 2014/0003721 A1* | 1/2014 | Saund | G06K 9/00449 |
| | | | 382/182 |
| 2016/0179788 A1* | 6/2016 | Clark | G06F 17/21 |
| | | | 704/9 |
| 2017/0011023 A1* | 1/2017 | Ghannam | G06F 17/271 |
| 2017/0286529 A1* | 10/2017 | O'Neill | G06F 17/30684 |

* cited by examiner

RECOMMENDING FORM FIELD AUGMENTATION BASED UPON UNSTRUCTURED DATA

BACKGROUND

When an incident occurs (e.g., an application fails to perform as expected, an employee injury occurs, a delivery time is not met, a customer provides a survey, etc.) a company generally requests information explaining the incident, how the incident occurred, and other information relating to the incident. In collecting this information a company may employ a report or form to collect the information. A user may then fill out this report or form with the relevant information.

Usually these reports or forms contain both structured fields and unstructured fields. Structured fields are fields which have a fixed input or format, for example, employee name, date of incident, location of the incident, and the like. Unstructured fields allow a user to provide free form text, for example, description of the incident, comments, other relevant details, and the like. The company may then use the information collected from the completed forms or reports to gather insight relating to underlying issues that may be causing similar incidents to occur. The company may then take appropriate action to remediate or address the underlying issues or causes of the incidents.

BRIEF SUMMARY

In summary, one aspect of the invention provides a method for recommending a structured field for a form from unstructured text data, the method comprising: utilizing at least one processor to execute computer code that performs the steps of: obtaining text data from at least one unstructured field, wherein the at least one unstructured field is contained within a completed form generated from a template form; identifying at least one topic associated with the text data; generating a model, wherein the model analyzes use of the least one topic as a structured field; determining, using the model, whether the accuracy of the template form has increased based upon use of the at least one topic as a structured field; and recommending, based upon the determining, at least one modification for a structured field for the template form, wherein the at least one structured field is associated with the at least topic.

Another aspect of the invention provides an apparatus for recommending a structured field for a form from unstructured text data, the apparatus comprising: at least one processor; and a computer readable storage medium having computer readable program code embodied therewith and executable by the at least one processor, the computer readable program code comprising: computer readable program code that obtains text data from at least one unstructured field, wherein the at least one unstructured field is contained within a completed form generated from a template form; computer readable program code that identifies at least one topic associated with the text data; computer readable program code that generates a model, wherein the model analyzes use of the least one topic as a structured field; computer readable program code that determines, using the model, whether the accuracy of the template form has increased based upon use of the at least one topic as a structured field; and computer readable program code that recommends, based upon the determining, at least one modification for a structured field for the template form, wherein the at least one structured field is associated with the at least topic.

An additional aspect of the invention provides a computer program product for recommending a structured field for a form from unstructured text data, the computer program product comprising: a computer readable storage medium having computer readable program code embodied therewith, the computer readable program code comprising: computer readable program code that obtains text data from at least one unstructured field, wherein the at least one unstructured field is contained within a completed form generated from a template form; computer readable program code that identifies at least one topic associated with the text data; computer readable program code that generates a model, wherein the model analyzes use of the least one topic as a structured field; computer readable program code that determines, using the model, whether the accuracy of the template form has increased based upon use of the at least one topic as a structured field; and computer readable program code that recommends, based upon the determining, at least one modification for a structured field for the template form, wherein the at least one structured field is associated with the at least topic.

A further aspect of the invention provides a method for recommending a structured field for a form from unstructured text data, the method comprising: utilizing at least one processor to execute computer code that performs the steps of: obtaining text data from a plurality of unstructured fields, wherein the plurality of unstructured fields are similar to each other and contained within a plurality of completed forms, the forms being similar to each other and generated from a template form; analyzing the text data to identify at least one topic contained within the text data; generating at least one hypothesis, wherein the at least one hypothesis treats the at least one topic as a structured field; building a prediction model based upon the at least one hypothesis to determine a gain in accuracy of the template form based upon using the at least one topic as a structured field within the template form; conducting at least one additional iteration of analyzing the text data, generating a hypothesis, and building a prediction model to determine a gain in accuracy; identifying at least one generated hypothesis having the highest gain in accuracy by comparing the gain in accuracy of the generated hypotheses; and recommending at least one modification for a structured field for the template form from the identified hypothesis having the highest gain in accuracy, wherein the at least one structured field is associated with the at least topic.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 2. In accordance with an example embodiment, most if not all of the process steps, components and outputs discussed with respect to FIG. 1 can be performed or utilized by way of a processing unit or units and system memory such as those indicated, respectively, at 16' and 28' in FIG. 2, whether on a server computer, a client computer, a node computer in a distributed network, or any combination thereof.

The term incident will be used throughout this disclosure for ease of explanation. This term not only encompasses problems and malfunctions, but also encompasses any event which triggers provision of information through a form or report. For example, an incident may refer to a customer satisfaction survey, provision of comments, and the like.

After a company or other entity receives completed reports or forms detailing an incident, the company may build a predictive model to gain insight on factors such as performance issues, quality issues, safety issues, and the like. To ensure that an accurate predictive model can be built, the information received must be rich enough to gather the necessary information. Additionally, the information must be fairly consistent between completed reports so that information necessary for building the predictive model is present. Usually, to ensure the richness and consistency of the information, structured fields are employed within the form. This ensures that the information necessary for building the predictive model will exist.

However, if the form contains too many structured fields, a user filling out the form may not enter correct or accurate information, thereby creating information that is of low quality for creating a predictive model. For example, the user may lose patience and fill in structured fields with default values as opposed to accurate values. Additionally, structured fields do not allow a user to provide any information outside of the information requested by the field. One solution to this problem is to employ the use of unstructured fields allowing a user to enter free form text. The problem with unstructured fields is that not every user fills out the unstructured fields in the same way. For example, a worker at a first location may provide information in the unstructured field that a worker in a second location does not, even when the incident is the same between the locations. Thus, in creating the template for the form or report, enough structured fields need to be provided so that a predictive model can be accurately created, but not so many that the users get frustrated and lose patience.

Accordingly, an embodiment provides a method of using unstructured fields within the reports to recommend structured fields to be added to, removed from, or otherwise modified within the template form. One embodiment may obtain text data from an unstructured field of a completed form generated from a template form. The completed form or report is the survey, form, or report that has been filled out by a user, while the template form is the survey or form before being filled out by a user.

Using the text data an embodiment may identify at least one topic associated with the text data. One embodiment identifying the at least one topic may include using a text analytic technique and/or categorizing the text data. An embodiment may then generate a model or hypothesis that treats the identified topic as a structured field. Using the topic as a structured field, an embodiment may determine if the accuracy of the form has been increased based upon the addition of the structured field. If the accuracy of the form has been increased, an embodiment may recommend the topic be added as a structured field to the template form. Alternatively, an embodiment may build a model or hypothesis in which the topic, which is already a structured field, is no longer a structured field. If the accuracy of the form is increased, the system may recommend that the structured field be removed from the template form.

Such a system provides a technical improvement over current systems for generating form templates because structured fields are recommended based upon the text data received in unstructured fields rather than requiring a user to manually enter and determine the structured fields to be included in the template forms. Such a system allows for inclusion of structured fields which will provide the system with the most useful information for generating a predictive model. Additionally, the system provides a way of identifying structured fields that should be removed because they fail to provide information which lends itself to playing an important role in the predictive modeling. Thus, the systems provide a method of creating a template form which has enough structured fields to gather the necessary information for predictive modeling, but also ensures that not so many structured fields are included that a user to loses patience and fails to provide quality information.

Figure 1:
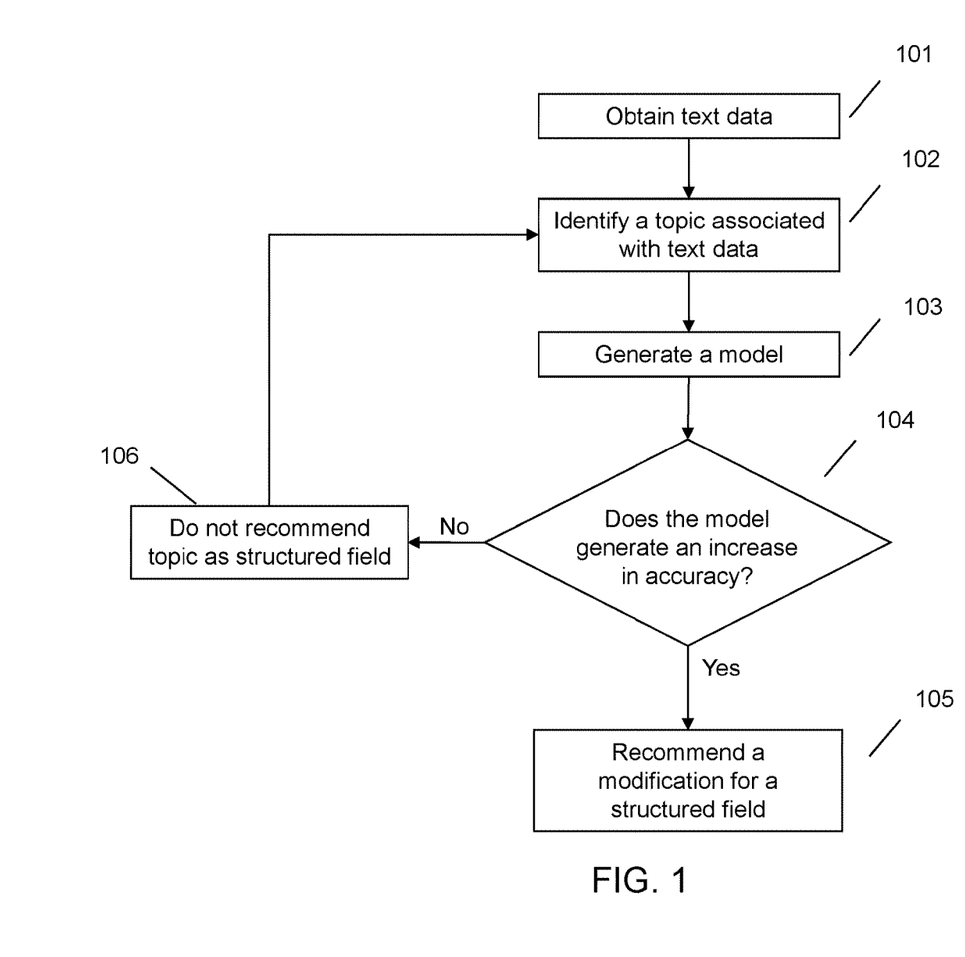
FIG. 1 illustrates a method of recommending form field augmentation based on unstructured data.

In FIG. 1 at 101 an embodiment may obtain text data from at least one unstructured field contained within a completed form generated from a template form. For example, when an injury occurs at a company the company may require that a user fill out an incident report. The incident report before being filled out by the user may be considered the template form. Upon completion of the form, the form may be submitted as a completed form or report. The text data included in any unstructured fields in the report may then be obtained by the system.

To obtain the text data, the system may receive the information from a source. For example, a form may be submitted to the system. Alternatively, the system may obtain the information by accessing a storage location (e.g., local storage, remote storage, third party storage, etc.) and capturing the necessary information. For example, all the completed forms may be stored in a cloud storage system which can be accessed by the system. In other words, the obtaining may be a passive or an active action by the system.

As discussed above, an unstructured field may include free form text data which may be in different forms. For example, the free form text data may be listed in bullet points, written in complete sentences, and the like. In one embodiment, the system may determine what text data are necessary for analysis and may only obtain that text data. Alternatively, the system may obtain all the text data and parse and analyze the text data at a later time. The system may obtain more than just the text data within the unstructured fields. For example, the system may also obtain text data contained within a structured field. Additionally, the system may obtain information relating to the form itself, for example, field headings, format, form title, and the like. The additional information may assist the system in determining relevant information to be included in any analysis completed by the system.

An embodiment may capture information from more than one unstructured field within the completed form. For example, the system may identify two unstructured fields on the same completed form which provide information necessary for the analysis as described in more detail below. Additionally, in one embodiment, the text data may be obtained from more than one completed form. For example, the system may obtain the text data from all similar forms. As an example, if a company requires that a user complete an incident report when a delivery time is not met, the company may have a specific form for this type of incident. The system may then obtain the text data from all the reports which are identified as missed delivery time reports.

At 102, an embodiment may identify at least one topic associated with the obtained text data. The topic may include a category, theme, action, idea, concept, key feature, and the like, that may be identified as important or substantive. For example, using a text analytics technique, an embodiment may remove all the words in the text data that are identified as not important or non-descriptive, such as prepositions, conjunctions, articles, and the like. Identifying a topic may include categorizing words or phrases contained within the text data. For example, the system may group similar words into different categories. The system may then identify the category heading, or, alternatively, a user may provide category headings at a later time.

In identifying a topic an embodiment may use a text analytics technique, which may mine words or information from the text data. As an example, an embodiment may parse the text data and identify patterns within the text data. An embodiment may also categorize the text data, cluster the text data, extract a concept or entity from the text data, and the like. The system may then interpret the output to identify whether a word or phrase contained within the text data may be considered important. In one embodiment the text analytics technique may be supervised. For example, a user may provide categories (e.g., action, type, causal factor, etc.) to be used by the system during the text analytics. Alternatively, the text analytics technique may be unsupervised. For example, the system may group the text data based upon similarity of the words or phrases.

Identifying a topic may include identifying a reoccurring topic. For example, if the system is analyzing multiple unstructured fields on the same form or multiple forms having the same unstructured fields, the system may identify topics which occur across more than one of the unstructured fields or forms. Alternatively, the system may identify all topics and identify or mark topics occurring across multiple fields or forms. A reoccurring topic may indicate that an underlying issue should be addressed.

At 103, an embodiment may generate a model or hypothesis that encompasses the identified topic or topics. The model may also include additional topics or fields, for example, topics or fields that are already included in the template form. Such a model may be used to analyze the use of the topic as a structured field. For example, if the system has identified that "stairs" is a topic that reoccurs in multiple completed forms, the model may include "Did the injury occur on stairs?" as a structured field within the template form. The system then analyzes the accuracy of the template form with the newly included structured field. As an example, the system may treat the topic as a structured field and then determine how many of the completed reports would have indicated this information as relevant to the incident.

As another example, an embodiment may have information relating to how severe an incident is considered. For example, breaking a bone may be considered more severe than a small laceration. Based upon the severity of an incident an embodiment may analyze which topics reoccur in the incidents at a specific level of severity. The topics occurring in the incidents at the highest severity level may then be considered for structured fields. As an example, if "falling from heights" is a topic that has been identified, an embodiment may determine if any of the incidents including "falling from heights" is considered to be a severe incident. If so, an embodiment may identify this topic for inclusion as a structured text field on the template form.

Using the generated model or hypotheses, at 104, an embodiment may determine whether the accuracy of the form has increased based on using the topic as a structured field in the template form. In determining accuracy, an embodiment may be determining whether the inclusion or exclusion of a structured field causes the information provided on a generated form to be more or less useful in identifying a root cause or a reoccurring cause of incidents. As an example, an embodiment may determine if the template form becomes more accurate if the topic is included as a structured field. For example, an embodiment may build a prediction model (e.g., a decision tree) for the included topic and record the accuracy of the resulting model. In one embodiment, the system may perform steps 102, 103, and 104, more than once using different identified topics for the model. A generated model or hypotheses may include removing a structured field from the template form. For example, a model may include removing a structured field which is currently included in the template form and a gain in accuracy can then be determined. Also, the model or hypotheses may include modifying a structured field. For example, a model may include changing the way a structured field is worded. In this way, the system and methods as described herein can recommend structured fields for addition to, removal from, or modification within the template form.

If the gain in accuracy of the form decreases, is unchanged, or fails to meet a predetermined threshold, an embodiment may not recommend the topic as a structured field at 106. An embodiment may then identify another or additional topics associated with the text data at 102. If, however, the gain in accuracy of the form increases or increases above a predetermined level, an embodiment may recommend a modification for a structured field within the template form at 105. The recommended modification may include adding a structured field to the template form, removing a structured field from the template form, adding a new structured field and simultaneously removing a structured field, modifying an existing structured field, and the like.

In one embodiment, the topic recommended for modification within the form may include the topic that was included in the model generating the highest gain in accuracy. For example, if the system iteratively completes steps 102, 103, and 104, for different identified topics, the generated models and resulting gain in accuracy may be compared between the multiple models. The topic or topics included in the model having the highest gain in accuracy may then be recommended for modification (e.g., inclusion, removal, modification, etc.) in the template form.

The system may also automatically generate the new template form based upon the recommended structured fields. Alternatively, the system may request user acceptance of the recommended structured fields before modifying the structured fields or template form. As an example, an embodiment may recommend a structured field that a user knows would not be useful or would be inappropriate to add to the template form. The user may then provide this feedback to the system and the system will not modify the structured field or template form based upon this feedback.

Figure 2:
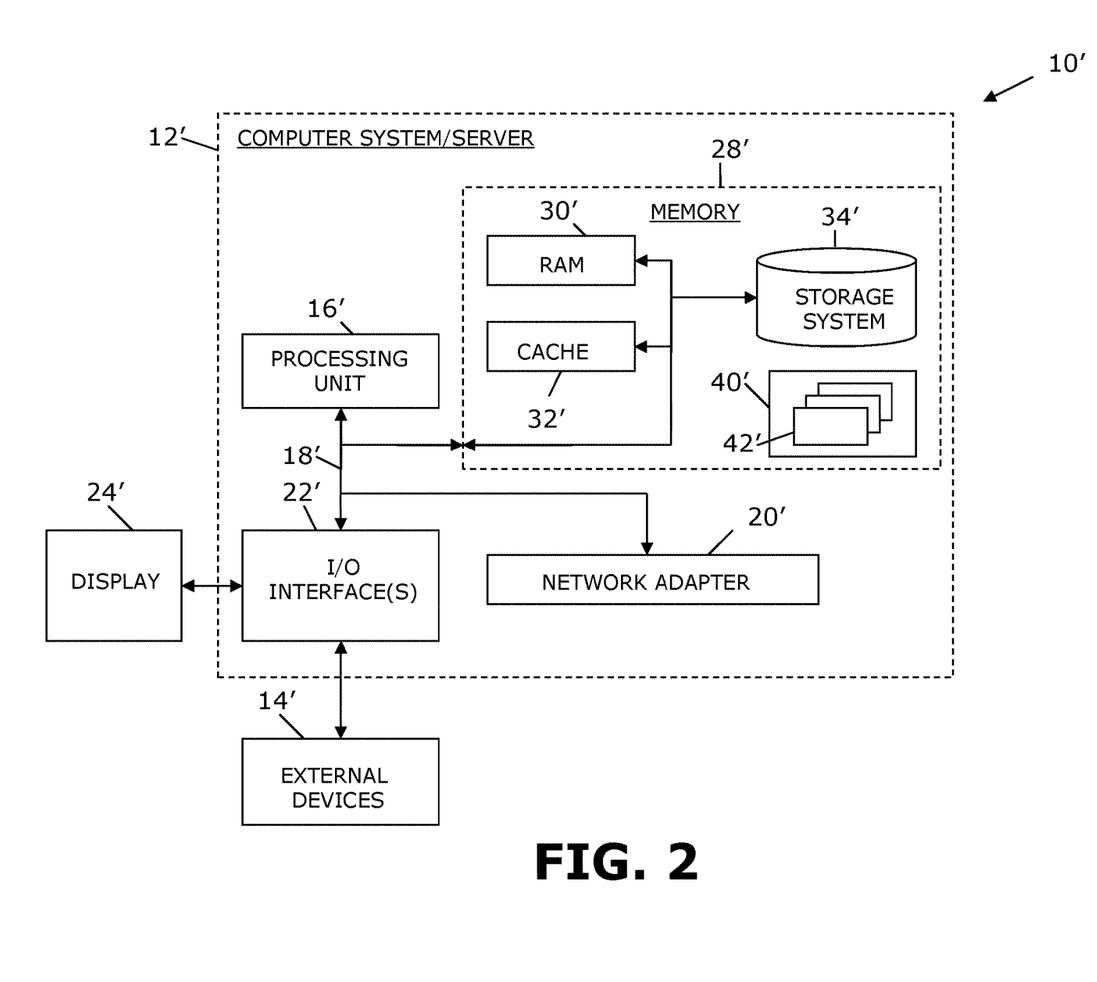
FIG. 2 illustrates a computer system.

As shown in FIG. 2, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for recommending a structured field for a form from unstructured text data, the method comprising:
utilizing at least one processor to execute computer code that performs the steps of:
obtaining text data from at least one unstructured field, wherein the at least one unstructured field is contained within a completed form generated from a template form;
identifying at least one topic associated with the text data;
generating at least one hypothesis, wherein the at least one hypothesis treats the least one topic as a structured field within the template form;
determining, using the at least one hypothesis, whether the accuracy of the template form has increased based upon use of the at least one topic as a structured field within the template form; and
recommending, based upon the determining, at least one modification to the template form, wherein the at least one modification is an addition of a structured field corresponding to the at least one topic.

2. The method of claim 1, wherein the obtaining text data comprises obtaining text data from more than one completed form.

3. The method of claim 2, wherein the identifying at least one topic comprises identifying a topic that is common between the completed forms.

4. The method of claim 1, wherein the identifying at least one topic comprises identifying a topic that is common between a plurality of unstructured fields.

5. The method of claim 1, wherein the identifying at least one topic comprises categorizing the text data.

6. The method of claim 1, wherein the identifying at least one topic comprises using at least one text analytic technique.

7. The method of claim 6, wherein the at least one text analytic technique comprises a supervised text analytic technique.

8. The method of claim 6, wherein the at least one text analytic technique comprises an unsupervised text analytic technique.

9. The method of claim 1, comprising conducting at least one additional iteration of identifying a topic, generating a model, and determining whether the accuracy of the template form has increased.

10. The method of claim 9, wherein the recommending comprises recommending at least one structured field based upon the model having an increase in accuracy exceeding a predetermined threshold.

11. The method of claim 9, comprising identifying at least one generated model having the highest increase in accuracy.

12. The method of claim 11, wherein the recommending comprises recommending at least one structured field from the identified model.

13. An apparatus for recommending a structured field for a form from unstructured text data, the apparatus comprising:
at least one processor; and
a computer readable storage medium having computer readable program code embodied therewith and executable by the at least one processor, the computer readable program code comprising:
computer readable program code that obtains text data from at least one unstructured field, wherein the at least one unstructured field is contained within a completed form generated from a template form;
computer readable program code that identifies at least one topic associated with the text data;
computer readable program code that generates at least one hypothesis, wherein the at least one hypothesis treats the least one topic as a structured field within the template form;
computer readable program code that determines, using the at least one hypothesis, whether the accuracy of the template form has increased based upon use of the at least one topic as a structured field within the template form; and
computer readable program code that recommends, based upon the determining, at least one modification to the template form, wherein the at least one modification is an addition of a structured field corresponding to the at least one topic.

14. A computer program product for recommending a structured field for a form from unstructured text data, the computer program product comprising:
a computer readable storage medium having computer readable program code embodied therewith, the computer readable program code comprising:
computer readable program code that obtains text data from at least one unstructured field, wherein the at least one unstructured field is contained within a completed form generated from a template form;
computer readable program code that identifies at least one topic associated with the text data;
computer readable program code that generates at least one hypothesis, wherein the at least one hypothesis treats the least one topic as a structured field within the template form;
computer readable program code that determines, using the at least one hypothesis, whether the accuracy of the template form has increased based upon use of the at least one topic as a structured field within the template form; and
computer readable program code that recommends, based upon the determining, at least one modification to the template form, wherein the at least one modification is an addition of a structure field corresponding to the at least one topic.

15. The computer program product of claim 14, wherein the computer readable program code that obtains text data comprises obtaining text data from more than one completed form and wherein the computer readable program code that identifies at least one topic comprises identifying a topic that is common between the completed forms.

16. The computer program product of claim 14, wherein the computer readable program code that identifies at least one topic comprises identifying a topic that is common between a plurality of unstructured fields.

17. The computer program product of claim 14, wherein the computer readable program code that identifies at least one topic comprises using at least one text analytic technique.

18. The computer program product of claim 14, comprising conducting at least one additional iteration of identifying a topic, generating a model, and determining whether the accuracy of the template form has increased.

19. The computer program product of claim 14, comprising computer readable program code that identifies at least one generated model having a highest increase in accuracy and wherein the computer readable program code that recommends comprises recommending at least one structured field from the identified model having a highest increase in accuracy.

20. A method for recommending a structured field for a form from unstructured text data, the method comprising:
utilizing at least one processor to execute computer code that performs the steps of:
obtaining text data from a plurality of unstructured fields, wherein the plurality of unstructured fields are similar to each other and contained within a plurality of completed forms, the foams being similar to each other and generated from a template form;
analyzing the text data to identify at least one topic contained within the text data;
generating at least one hypothesis, wherein the at least one hypothesis treats the at least one topic as a structured field within the template form;
building a prediction model based upon the generated at least one hypothesis to determine a gain in accuracy of the template form based upon using the at least one topic as a structured field within the template form;
conducting at least one additional iteration of analyzing the text data, generating at least one additional hypothesis, and building a prediction model based upon the generated at least one additional hypothesis to determine a gain in accuracy of the template form;
identifying from the generated at least one hypothesis and at least one additional hypothesis, at least one hypothesis having a highest gain in accuracy by comparing the gain in accuracy of the generated at least one hypothesis and at least one additional hypothesis; and
recommending at least one modification comprising an addition of a structured field for the template form from the identified hypothesis having the highest gain in accuracy, wherein the at least one structured field is associated with the at least one topic.

* * * * *